United States Patent [19]

Tabata et al.

[11] Patent Number: 4,924,910
[45] Date of Patent: May 15, 1990

[54] HYDRAULIC PRESSURE CONTROL VALVE

[75] Inventors: Kazumasa Tabata; Hiroshi Ooishi; Manabu Takaoka, all of Osaka, Japan

[73] Assignee: Koyo Seiko Co., Ltd., Osaka, Japan

[21] Appl. No.: 335,080

[22] Filed: Apr. 7, 1989

[30] Foreign Application Priority Data

Apr. 12, 1988 [JP] Japan .............................. 63-48863[U]
Aug. 10, 1988 [JP] Japan ............................ 63-106281[U]

[51] Int. Cl.$^5$ ..................... F15B 13/04; F16K 11/076
[52] U.S. Cl. .............................. 137/625.23; 91/375 A
[58] Field of Search ...................... 137/625.21, 625.22, 137/625.23, 625.24; 91/375 A, 375 R

[56] References Cited

U.S. PATENT DOCUMENTS 4,594,936  6/1986  Bacardit ............................ 91/375 R
4,624,283  11/1986  Fubata .............................. 91/375 A Primary Examiner—Alan Cohan
Attorney, Agent, or Firm—Townsend and Townsend

[57] ABSTRACT

A hydraulic pressure control valve of the present invention applied in hydraulic power steering includes a cylindrical casing whose plural first grooves disposed on its circumferential surface at stated intervals are brought in communication with different destinations of pressure oil, and a valve body which is inserted rotatably into the casing and whose second grooves of the same number as the first grooves, disposed on its peripheral surface at stated intervals are brought in communication alternately with a high pressure source and a low pressure source, and a portion thereof is disconnected with the low pressure source. At corners on the casing opposing each other across the communicating portions on both sides of the disconnected portion of the valve body, notches are formed in such a shape that, until the relative angular displacement between the valve body and casing reaches the predetermined magnitude, variations of communicating areas produced between the first and second grooves by the relative angular displacement is substantially not produced. In the hydraulic pressure control valve, the first groove of the valve body interposed between the notches is not in communication with the low pressure source, and the pressurized oil which flows in through one communicating portion of this portion is introduced into the groove of the adjacent casing through the other communicating portion without flowing back to the low pressure source, so that flowing noises of pressured oil produced when the relative displacement is produced between the valve body and casing can be reduced sharply.

10 Claims, 12 Drawing Sheets

HYDRAULIC PRESSURE CONTROL VALVE

BACKGROUND OF THE INVENTION

1. Field of the Invention

The present invention relates to a rotary hydraulic pressure control valve, particularly, it relates to a hydraulic pressure control valve which is preferable for controlling a feed oil pressure to a steering assisting hydraulic cylinder at hydraulic power steering.

2. Description of the Prior Art

A hydraulic power steering apparatus is designed to assist a power required for operating a steering wheel for steering by means of a hydraulic power produced by a hydraulic cylinder provided in a steering mechanism. In the hydraulic power steering apparatus, an input shaft linked to the steering wheel and an output shaft linked to the steering mechanism are coupled coaxially via a torsion bar, and responsive to a steering torque applied to the steering wheel, the relative angular displacement according to torsion of the torsion bar is produced between the two shafts. At joint of the two shafts, a cylindrical casing which rotates in interlocking motion with one shaft, and a rotary hydraulic pressure control valve inserted thereinto and including a valve body which rotates in interlocking motion with the other shaft are formed to control, by the operation of the hydraulic pressure control valve, feed oil pressure to the hydraulic cylinder responsive to the direction and magnitude of the relative angular displacement, namely, the direction and magnitude of the steering torque applied to the steering wheel.

In the hydraulic pressure control valve, the valve body is constituted by forming a plurality of grooves extending axially and equally spaced around the periphery near the joint end of either input or output shaft. The casing provided with the same number of grooves equally spaced around its inner surface is secured to the other joint end, and the valve body is inserted into the casing. The valve body and casing are so arranged that, when the relative angular displacement is not produced between the input and output shafts, the both grooves are staggered circumferentially, and portions communicating with the adjacent grooves and having the same areas are formed on the lateral sides of respective grooves. The hydraulic pressure control valve is constructed in a well known manner such that, for example, while the grooves in the valve body are connected alternately to a hydraulic pump of a high pressure source and an oil tank of a lower pressure source, the grooves in the casing are connected alternately to two oil chambers of the hydraulic cylinder. That is, the two oil chambers of the hydraulic cylinder are brought in communication with the high pressure source and low pressure source via the communicating portions on both sides of the grooves of the casing to which the respective oil chambers are connected. When the steering torque is applied to the steering wheel and the relative angular displacement is produced between the input and output shafts, in the groove connected to one oil chamber, communicating areas with the low pressure source are reduced and those with the high pressure source are increased, on the contrary, in the groove connected to the other oil chamber, communicating areas with the high pressure source are reduced and those with the low pressure source are increased. As a result, between the two oil chambers, the pressure difference in which the former oil chamber is larger than the latter oil chamber is produced and the steering assisting power is obtained responsive thereto.

Now, magnitudes of the power required for steering a motor vehicle are responsive to those of road reaction force acting on wheels. At a standstill and in the driving condition such as low speed driving where the reaction force is large, a large steering power is required, while in the driving condition such as high speed driving where the reaction force is small, a relatively small steering power is required. Thus, in the power steering apparatus, as shown in FIG. 1, when the steering torque applied to the steering wheel is less than a predetermined value $T_1$, the steering assisting power is hardly produced, giving the same rigidity as the manual steering to enhance the rectilinear stability at high speed driving. While, when the steering torque exceeds the other predetermined value $T_2$ larger than the value $T_1$, the steering assisting power increasing suddenly against the increment is produced to reduce the steering power required for operating the steering wheel as low as possible. Furthermore, with respect to steering torques between the values $T_1$ and $T_2$, the steering assisting power which increases gradually against the increment must be produced. That is, desirable increment characteristics in the power steering apparatus is a so-called two-step characteristics having two increment variations at the values $T_1$ and $T_2$.

As described hereinabove, the steering assisting power corresponds to the pressure difference produced between the two oil chambers of the hydraulic cylinder, and the pressure difference changes responsive to areas of the communicating portions in the hydraulic pressure control valve. Thus, the two-step characteristics aforementioned is realized when the areas of communicating portions change rapidly until reaching the predetermined value and change gradually in its neighborhood thereafter, in the case where the relative angular displacement produced between the valve body and casing responsive to the steering torque applied to the steering wheel is small, and when the relative angular displacement is larger, change rapidly against the increment.

Therefore, various hydraulic pressure control valves designed to realize the two-step characteristics in the power steering apparatus, by forming notches at the corners between side walls of the groove and the inner surface of the casing or the periphery of the valve body to obtain the variable states of communicating areas as aforementioned, have been proposed hitherto.

Among these, as the control valve capable of realizing the aforesaid variable states relatively faithfully, for example, notches shown in FIG. 2 are formed therein.

In the figure, the numeral 1 indicates a casing and 2 denotes a valve body. In the casing 1, rectangular sectional grooves 5 extending axially are formed around the inner surface, and in the valve body 2, the similar grooves 6 are formed around its peripheral surface. The grooves 5 and 6 are positioned so as to be communicated one another via communicating portions 8, 8 having the same area on respective lateral sides, when the relative angular displacement between the casing 1 and valve body 2 is not produced.

At the corners between the inner circumferential surface of the casing 1 and side walls of the groove 5, notches 50 which keep communicating areas in the communicating portions 8, 8 substantially unchanged within the predetermined range against the increment of the relative angular displacement produced between the casing 1 and valve body 2 are formed. As shown in the figure, the notch 50 includes a first portion 50a which is a circular arc or a straight line parallel to the inner surface of the casing 1 and intersecting the side wall of the groove 5, and a linear second portion 50b which intersects with the first portion 50a and the inner surface of the casing 1 approximately at right angles and linking the two. The notches 50 may be formed at the corners of the valve body 2 opposing the corners aforementioned across the communicating portions 8.

FIG. 3 is an explanatory view of the variable state of areas of the communicating portion 8 having the notch 50. The areas of communicating portion 8 reduce rapidly until the corner of the valve body 2 reaches the position indicated by the broken line in the figure, responsive to the relative angular displacement produced between the casing 1 and the valve body 2. Thereafter, until the corner reaches the position indicated by the one-dot chain line in the figure, the areas of communicating portion 8 depend upon the radial depth b in the first portion 50a, an do not substantially change against the increment of the relative angular displacement, since the portion 50a is in parallel to the peripheral surface of the casing 1. When the relative angular displacement increases further, the areas of communicating portion 8 tend to reduce rapidly against the increment of the relative angular displacement since it depends upon the circumferential width s between the corner and the second portion 50b. Accordingly, by combining the notches 50 and the well-known notches which are formed separately therefrom and in which the communicating areas reduce gradually as the relative angular displacement increases, the two-step characteristics of the steering assisting power aforementioned is realized and a comfortable steering feeling can be obtained.

In the hydraulic pressure control valve, however, when the relative angular displacement between the casing 1 and valve body 2 is large and a gap s between the corner of the valve body 2 and the second portion 50b is small, for example, pressure oil which flows through the communicating portion 8 from the groove 5 toward the groove 6, as indicated by the white arrow in FIG. 3, after flowing into the notch 50 circumferentially along the casing 1, changes its flowing direction and flows through the gap between the second portion 50b and the corner of the valve body 2 approximately radially to the casing 1 into the groove 6, consequently, the flowing direction being changed suddenly almost perpendicularly in the notch 50. Thus in a motor vehicle including the power steering apparatus constituted by using such a hydraulic pressure control valve, for example, when the large steering operation is executed at a standstill or low speed driving such as entering the garage or putting aside the road and so on, there is a possibility that discordant flowing noises caused by the change of flowing direction occur, annoying the comfortable feeling as well as causing the driver misjudgement that as if abnormalities were occurring by hearing the flowing noises.

SUMMARY OF THE INVENTION

The present invention has been devised in view of the circumstances aforementioned, it is therefore a primary object thereof to provide a hydraulic pressure control valve capable of reducing pressure oil flowing noises produced when the relative displacement is produced between a valve body and a casing without marring the two-step characteristics realized by notches.

It is another object of the present invention to provide a hydraulic pressure control valve capable of reducing the noise produced by the pressure oil flow sharply, and realizing the desired variable state of areas in the communicating portions without producing the sudden change of pressure oil flow in communicating portions between the grooves.

The above and further objects and features of the invention will more fully be apparent from the following detailed description with accompanying drawings.

DESCRIPTION OF THE PREFERRED EMBODIMENTS

Figure 4:
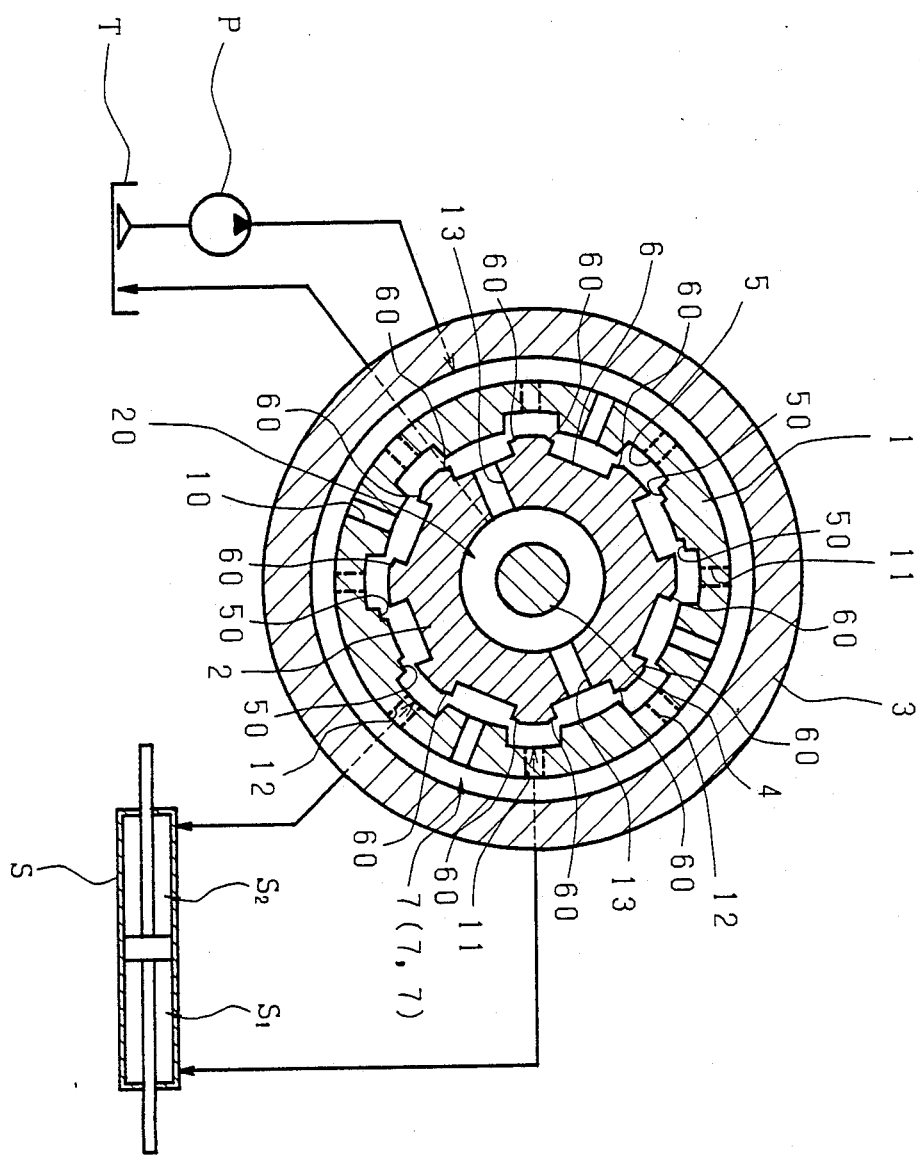
FIG. 4 is a sectional front view of a hydraulic pressure control valve according to the present invention shown together with a hydraulic flow diagram of a power steering apparatus.

The present invention will be described in the following with reference to the drawings showing the embodiments. FIG. 4 is a sectional front view of a hydraulic pressure control valve according to the present invention shown together with a hydraulic flow diagram of a power steering apparatus employing the hydraulic pressure control valve.

The hydraulic pressure control valve according to the present invention, in the same way as the prior art, includes a cylindrical casing 1 and a cylindrical valve body 2 which has the outside diameter approximately the same size as the inside diameter of the casing 1. When applying the hydraulic pressure control valve in the power steering apparatus, the valve body 2 is constructed at the lower portion of an input shaft (not shown) which is provided with a steering wheel secured coaxially at its upper end portion and rotates axially in interlocking motion with the rotation of the steering wheel. While, the casing 1 is secured to the upper end portion of an output shaft (not shown) connected at the lower end portion operatively to a steering mechanism. The input shaft and output shaft are linked coaxially via a torsion bar 4. At the joint, the valve body 2 is inserted into the casing 1 which is inserted rotatably into a cylindrical housing 3 surrounding the two shafts to constitute a hydraulic pressure control valve of the present invention. Accordingly, as shown in the figure, the torsion bar 4 is positioned in a cavity 20 in the axis of the valve body 2. When the steering torque is applied to the steering wheel, the valve body 2 tends to rotate as the input shaft rotates. While, the reaction force from the road surface exerted on wheels acts on the output shaft via the steering mechanism, the casing 1 secured thereto is restrained from rotation by the reaction force. Thus, the torsion bar 4 is subjected to distortion corresponding to the steering torque applied to the steering wheel, and the relative angular displacement responsive to the distortion is produced between the casing 1 and valve body 2.

Figure 5:
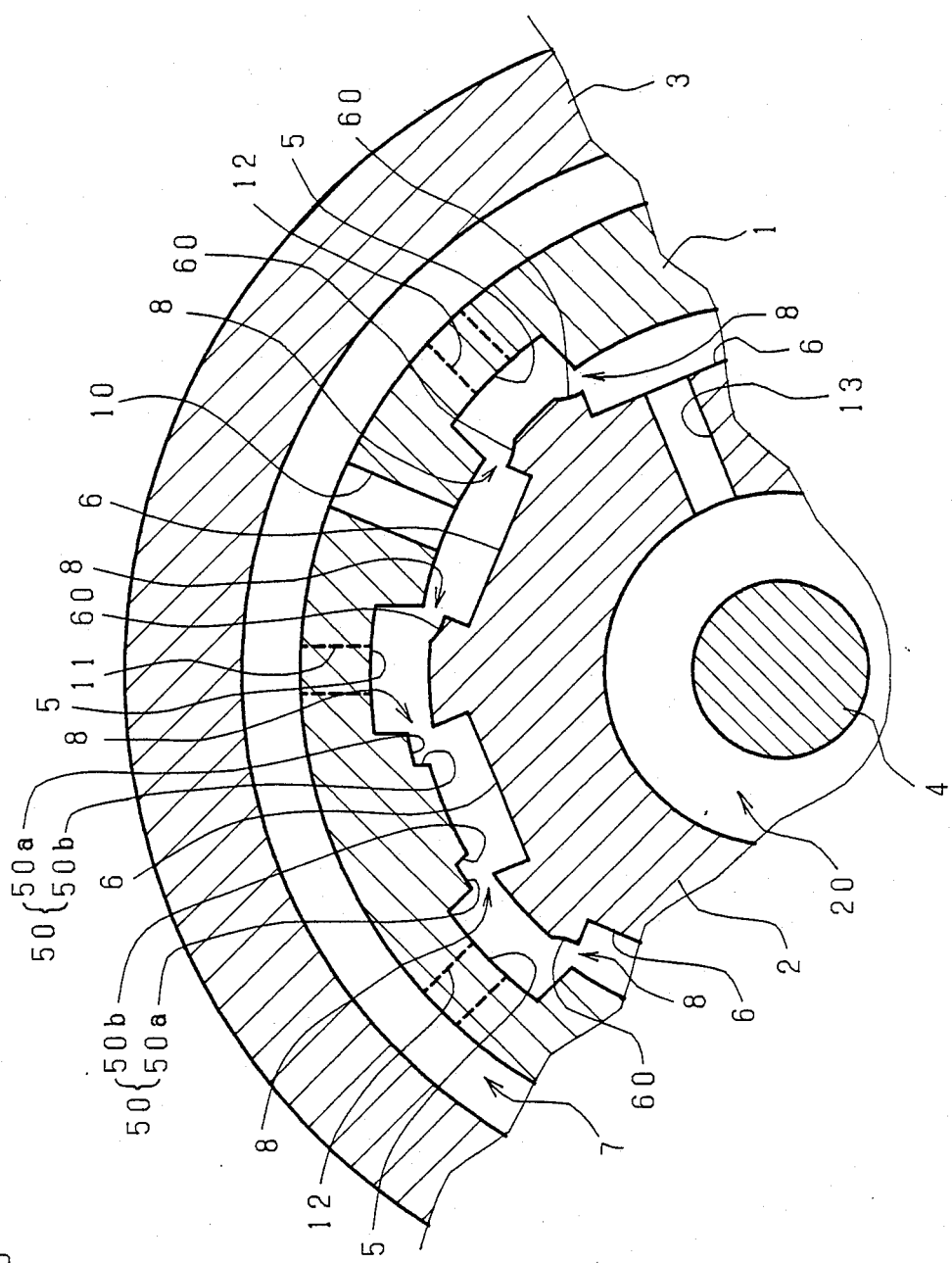
FIG. 5 is a partially enlarged view of FIG. 4 showing the forming mode of notches.

On the inner circumferential surface of the casing 1, eight (8) grooves 5, 5 . . . having rectangular section are formed axially lengthwise. Also on the peripheral surface of the valve body 2, similar 8 grooves 6, 6 . . . are formed at stated intervals circumferentially. As shown in FIG. 4, in the casing 1 and valve body 2, the grooves 5, 5 . . . and 6, 6 . . . are staggered and when the torsion bar 4 is not distorted (neutral state), the grooves 5 and 6 adjoining each other are in communication via equiareal communicating portions 8, 8 on the lateral sides (refer to FIG. 5). On the peripheral surface of the casing 1, three (3) annular grooves 7, 7, 7 (only one in the center is shown) extending all around are formed at a suitably spaced intervals axially. The center annular groove 7 shown is connected to a hydraulic pump P, and the other two annular grooves 7, 7 not shown are connected separately to oil chambers $S_1$, $S_2$ of a hydraulic cylinder S constituted at a portion of a steering mechanism for assisting the steering force. The center annular groove 7 is connected to four (4) grooves 6, 6 . . . which are positioned alternately among the eight (8) grooves 6, 6 . . ., through inlet holes 10 which extend radially through the casing 1 and is opened approximately in the center of projection between the grooves 5, 5. One of the other two annular grooves 7, 7 is connected to four (4) grooves 5, 5 . . . which are positioned alternately among eight (8) grooves 5, 5 . . ., through first outlet holes 11 formed by extending radially through the casing 1. The other annular groove 7 is connected to the other four (4) grooves 5, 5 . . ., through second outlet holes 12 formed similarly. The two grooves 6, 6, which oppose each other radially on the valve body 2, among the four (4) remained grooves 6, 6 . . . are connected to the cavity 20 communicating with an oil tank T through reflux holes 13 formed by extending radially through the valve body 2. Furthermore, the other two grooves 6, 6 are brought in communication with the low pressure source oil tank T in the same way as the aforesaid two grooves 6, 6 in the conventional hydraulic pressure control valve, on the contrary, in the hydraulic pressure control valve of the present invention, as shown in FIG. 4, they are disconnected with the other portions except being communicated with the adjacent grooves 5, 5 via the gaps 8, 8 on both sides.

On sixteen (16) corners formed between the side walls of respective grooves 6, 6 . . . and the peripheral surface of the valve body 2, except four (4) corners formed on both sides of the two grooves 6, 6 which are disconnected with the low pressure source, notches 60 having the single circular arc axial section are formed respectively. Among sixteen (16) corners formed similarly between the side walls of respective grooves 5, 5 . . . and the inner circumferential surface of the casing 1, . . . on four (4) corners opposing the four (4) corners of the valve body 2 aforementioned across the communicating portions 8, 8, notches 50 consisting of a first portion 50a which intersects with the side wall of the groove 5 and is in parallel to the inner circumferential surface of the casing 1, and a second portion 50b which intersects with the first portion 50a and the inner circumferential surface of the casing 1 respectively at an angle close to right angles in the axial section are formed. The notch 50 is as same as the notch 50 aforementioned indicated at like reference characters in FIG. 2.

Figure 6:
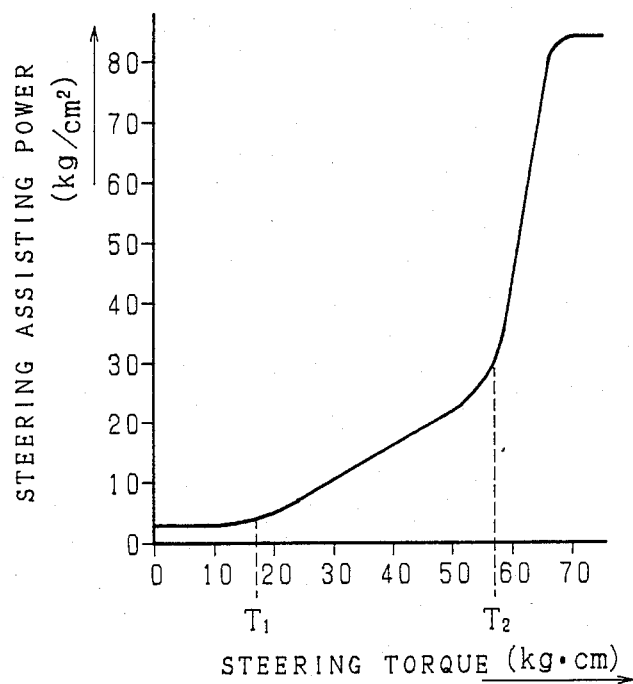
FIG. 6 is a graph showing increment characteristics of the steering assisting power in a power steering apparatus using a hydraulic pressure control valve according to the present invention.

Increment characteristics of a steering assisting power in a power steering apparatus utilizing a hydraulic pressure control valve according to the present invention constituted as described hereinabove is shown in FIG. 6. In the figure, steering torque applied to the steering wheel is plotted along the abscissa, and the steering assisting power produced by the hydraulic cylinder S along the ordinate as the pressure difference produced between the oil chambers $S_1$, $S_2$.

Figure 1:
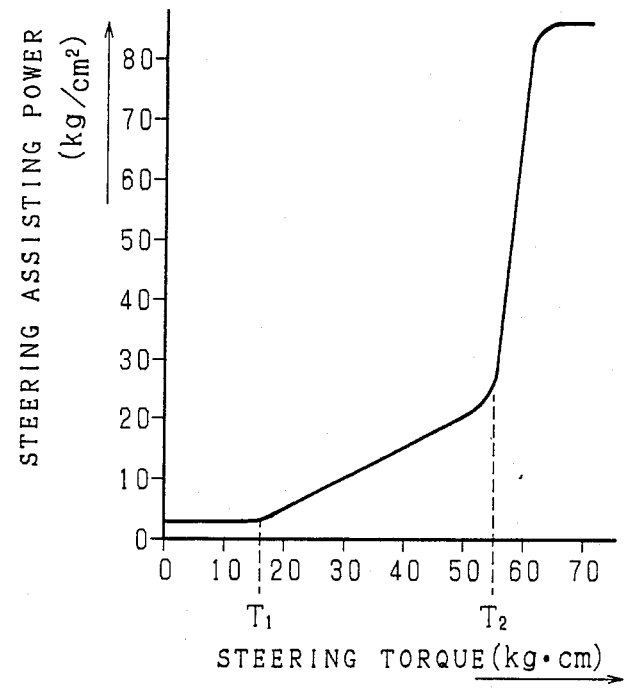
FIG. 1 is a graph showing desirable increment characteristics of the steering assisting power in a power steering apparatus.

The hydraulic pressure control valve formed with notches 60 having the shape aforementioned at the corners is known hitherto. When such notches 60 are formed, the areas of communicating portions 8 do not indicate desirable variations as aforementioned against the increment of relative angular displacement between the casing 1 and valve body 2. Thus, in the power steering apparatus using this hydraulic pressure control valve, it is generally known that the clear two-step characteristics as shown in FIG. 1 can not be obtained, showing the increment characteristics of the steering assisting power seen as chamfering respective steps shown in FIG. 1 by a curve having a large curvature.

On the contrary, in the hydraulic pressure control valve according to the present invention, notches 50, 50 . . . formed at four (4) corners of the casing 1 and having the shape aforementioned exert influence upon variations of the entire areas of communicating portions 8, 8 . . . . Accordingly, the increment characteristics of the steering assisting power in a power steering apparatus including the hydraulic pressure control valve becomes close to the two-step characteristics as shown in FIG. 6. When compared to the characteristic curve shown in FIG. 1 in the power steering apparatus including the conventional hydraulic pressure control valve, in which the groove 6 held between corners having the notches 50 is brought in communication with the lower pressure source, the characteristic curve shown in FIG. 6 shows hardly any difference except the circuit pressure in the neutral state is slightly higher. Hence it is clear that a good steering feeling can be obtained in the power steering apparatus including the hydraulic pressure control valve according to the present invention.

Figure 7:
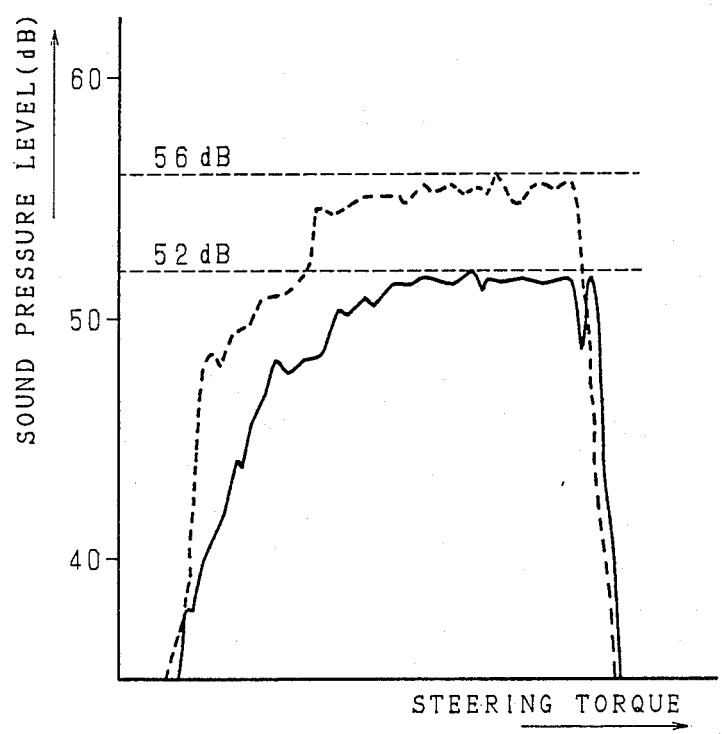
FIG. 7 is a graph in which a measured result of the pressure oil flowing noise produced in a hydraulic pressure control valve according to the present invention is compared with that of the conventional hydraulic pressure control valve.

Next, pressure oil flowing noises measured in the communicating portions 8, 8 in the hydraulic pressure control valve according to the present invention are shown in FIG. 7. In the figure, steering torque applied to a steering wheel, or the relative angular displacement between the casing 1 and valve body 2 is plotted along the abscissa, and sound-pressure levels measured at the predetermined distance from the hydraulic pressure control valve body along the ordinate. In the figure, for the sake of comparison, the same measurement performed on the conventional hydraulic pressure control valve in which the groove 6 held between notches 50 is brought in communication with the low pressure source is also shown by the broken line.

As shown in the figure, in the prior art hydraulic pressure control valve, the sound-pressure level of the flowing noise increases suddenly as the steering torque increases and the maximum level is 56 dB. On the contrary, in the hydraulic pressure control valve of the present invention, though the sound-pressure level of the flowing noise increases similarly as the steering torque increases, its increment rate is relatively small as compared with that of the conventional hydraulic pressure control valve and the maximum sound-pressure level is 52 dB. Also, in spite of magnitudes of the steering toque, a large decrementing effect of the flow noise can be obtained.

In the present embodiment, though the grooves 5, 5 ... of the casing 1 are brought in communication with the two oil chambers $S_1$, $S_2$ of the hydraulic cylinder S, and the grooves 6, 6 ... of the valve body 2 with the high pressure source hydraulic pump P and the low pressure source oil tank T respectively, it will be appreciated that, conversely, the grooves 5, 5 ... may be brought in communication with the hydraulic pump P and oil tank T, and the grooves 6, 6 ... with the oil chambers $S_1$, $S_2$ respectively.

Figure 8:
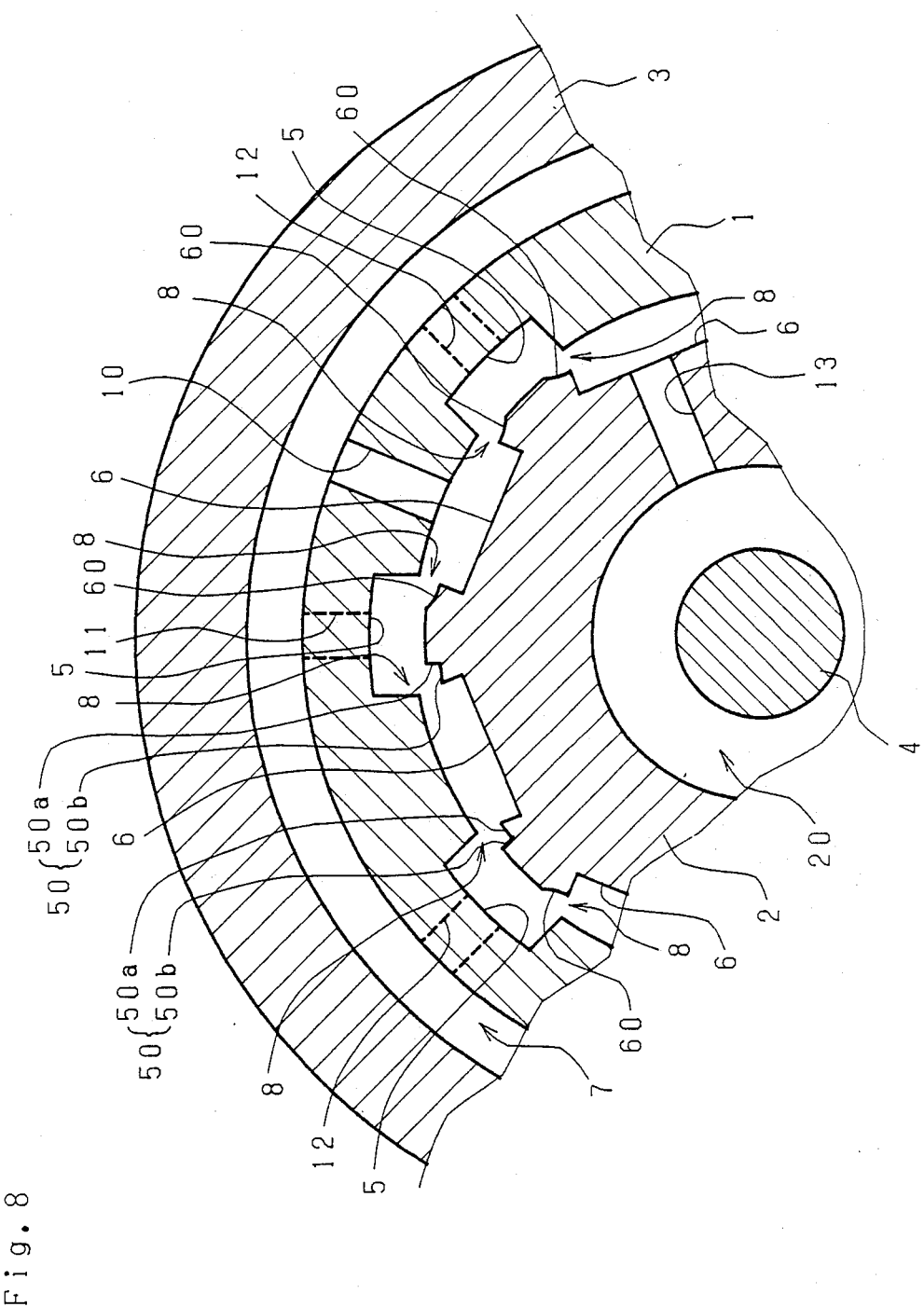
FIG. 8 is an enlarged sectional view showing the forming mode of notches of another embodiment.

FIG. 8 is an enlarged sectional view showing the configuration of notches of another embodiment. In the aforesaid embodiment, though notches 50 on both sides of the groove 6 which is disconnected with the low pressure portion, are formed at the corners on the casing 1 opposing the corners between side walls of the groove 6 and the peripheral surface of the valve body 2, as shown in FIG. 8, they may be formed at the corners on the valve body 2. In this case, it is to be understood that the first portion 50a is approximately in parallel to the peripheral surface of the valve body 2, and the second portion 50b intersects with the first portion 50a and the peripheral surface of the valve body 2 respectively at an angle close to right angles.

Figure 2:
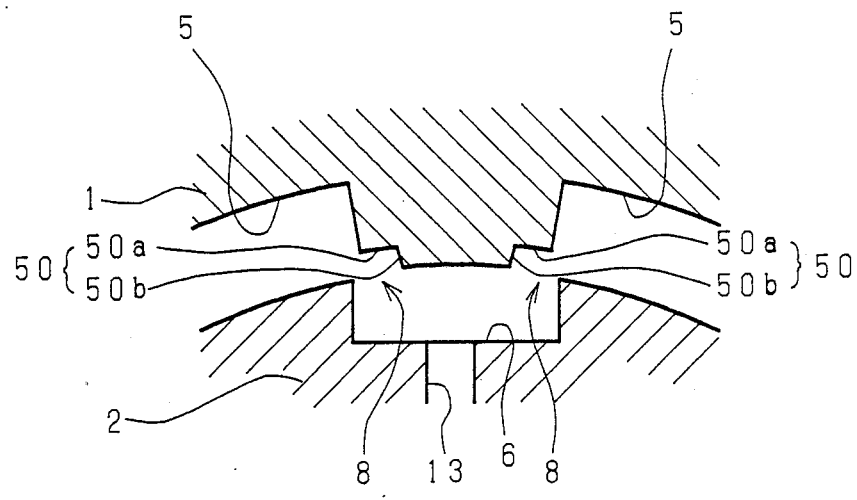
FIG. 2 is a view showing the forming mode of notches in a conventional hydraulic pressure control valve.
Figure 3:
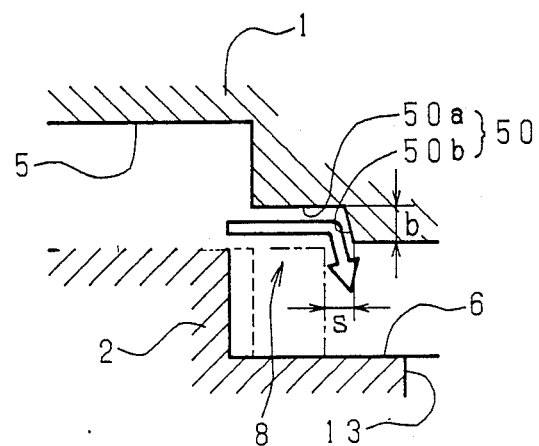
FIG. 3 is an explanatory view of the pressure oil flowing state at notches shown in FIG. 2.

As long as the notches 50 are shaped so as not to change the communicating areas substantially until the relative angular displacement between the casing 1 and valve body 2 reaches the predetermined magnitude, it is not limited to those shown in FIGS. 2 and 4. They may be shaped as proposed, for example, in Japanese Patent Application No. 63-66871, the second invention to be described later, by the applicant of the present invention.

The shape of notches 60 provided at the other corners is not limited to the single circular arc shown in the present embodiment, it may be formed otherwise, moreover, positions where the notches 60 are formed are not limited to the valve body 2 as shown in the present embodiment, they may be formed on the casing 1.

Furthermore, in the present embodiment, among the four (4) grooves 6, 6 ... which are to be in communication with the low pressure source, though two are disconnected therewith, the number of which may be one or three.

As particularly described hereinabove, in a hydraulic pressure control valve according to the first invention, by disconnecting grooves of the valve body or a part of the portions held therebetween with the low pressure source, and forming notches having the aforesaid shape at the corners of the valve body or casing opposing each other across the communicating portions on both sides of the disconnected portions, pressure oil flowing noises produced when the relative angular displacement occurs between the valve body and casing can be sharply reduced without marring the two-step characteristics, so that when the hydraulic pressure control valve is applied in the power steering apparatus, improvement of the rectilinear stability at high speed driving as well as reduction of the steering power at a standstill or low speed driving can both be realized, besides a comfortable feeling is improved by reduction of the flowing noise, moreover, misjudgment of the driver on abnormalities by hearing the flowing noise can be eliminated.

Subsequently, the second invention will be described.

Figure 9:
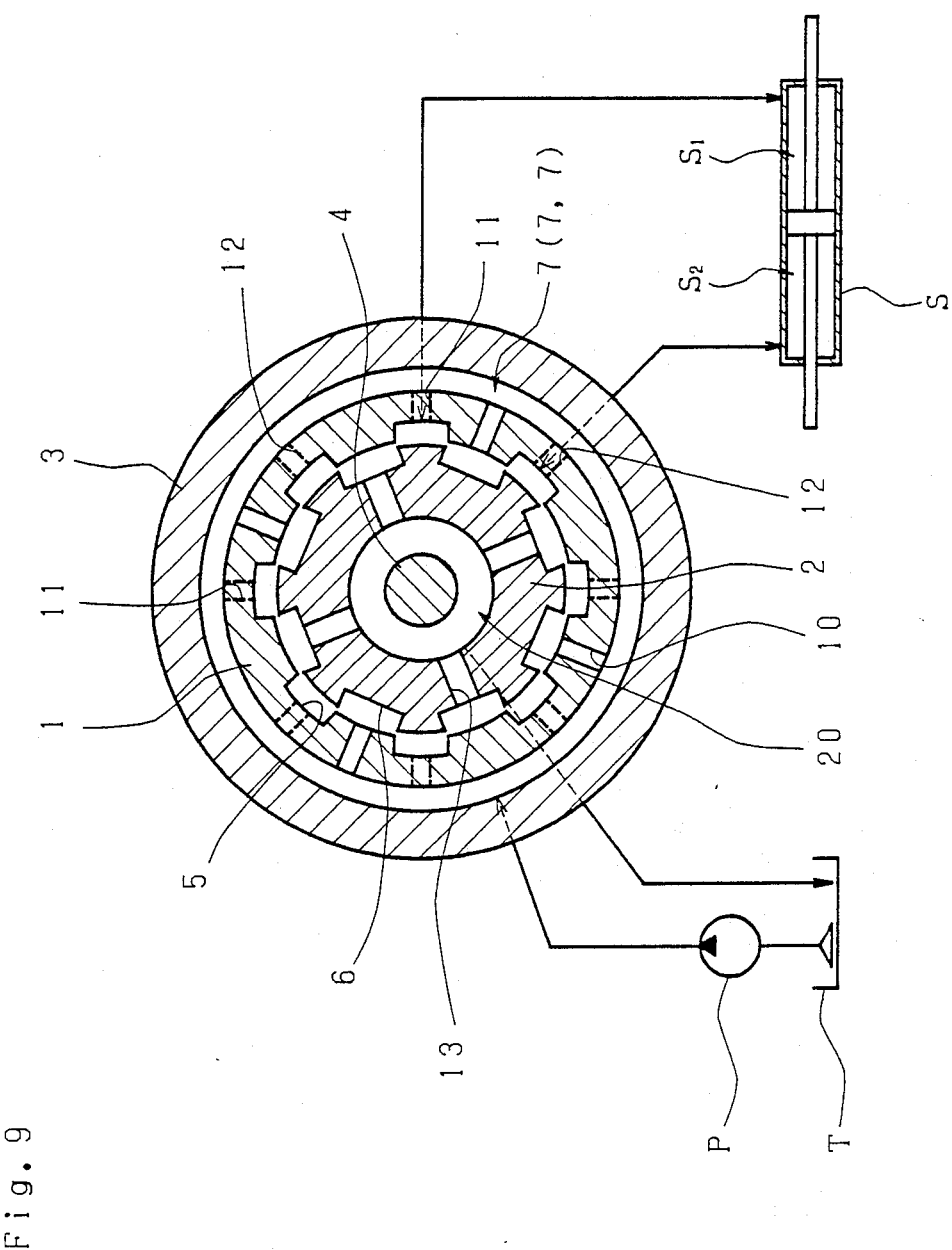
FIG. 9 is a sectional front view of a hydraulic pressure control valve according to the second invention shown together with a hydraulic flow diagram of a power steering apparatus.

FIG. 9 is a sectional front view of a hydraulic pressure control valve according to the second invention shown together with a hydraulic flow diagram of a power steering apparatus.

A hydraulic pressure control valve according to the present invention includes a cylindrical casing 1, and a cylindrical valve body 2 having the outside diameter approximately the same as the inside diameter of the casing 1 and inserted thereinto rotatably axially. When the hydraulic pressure control valve is applied in a power steering apparatus, the valve body 2 is constructed at the lower portion of an input shaft (not shown) which rotates axially as a steering wheel secured coaxially at the upper end portion is rotated. While, the casing 1 is secured coaxially to the upper end portion of an output shaft which is linked to a steering mechanism at the lower end portion to operate the steering mechanism by its rotation. The input and output shafts are linked together coaxially via a torsion bar 4. At the joint, the valve body 2 is inserted into the casing 1 whose periphery is supported rotatably inside a cylindrical housing 3 which is fixed to a suitable position of a vehicle and surrounding outside the two shafts to constitute the hydraulic pressure control valve. The torsion bar 4 is located on the center axis of the valve body 2 as shown in the figure so as to produce the relative angular displacement between the casing 1 and the valve body 2 responsive to distortion produced thereon as the steering wheel is steered.

On the inner circumferential surface of the casing 1, 8 groves 5, 5 ... having rectangular section are formed axially lengthwise, and on the peripheral surface of the valve body 2, similar 8 grooves 6, 6 ... are formed at stated intervals circumferentially. The casing 1 and valve body 2 are circumferentially positioned such that, as shown in FIG. 9, when the torsion bar 4 is not distorted (neutral state), the groves 5, 5 ... and 6, 6 ... are staggered and communicate one another via equiareal communicating portions 8, 8 on the lateral sides (refer to FIG. 10).

The grooves 6, 6 ... of the valve body 2 are formed with suitable axial longitudinal dimensions by using a rotary disc grinder, having a width similar to the circumferential width of the groove 6 and a suitable outside diameter, and rotating around the axis orthogonal to the axis of the valve body 2, and by feeding it toward the axis of the valve body 2 after contacting to the periphery of the valve body 2. The grooves 5, 5 . . . of the casing 1 are formed simultaneously with the inner surface finishing of the casing 1, by using a broach having projections at eight (8) positions corresponding to the shape of the groove 5 on a circular periphery similar to the finished inside diameter of the casing 1, and inserting it into the casing 1.

On the peripheral surface of the casing 1, three (3) annular grooves 7, 7, 7 (only one in the center is shown) extending all around are formed at a suitable intervals axially. The center annular groove 7 is connected to a hydraulic pump P and the other two annular grooves 7, 7 are connected respectively to oil chambers $S_1$, $S_2$ of a hydraulic cylinder S constituted at a portion of a steering mechanism for assisting the steering. The four (4) grooves 5, 5 which are positioned alternately among the grooves 5, 5 of casing 1 are in communication with one of the annular grooves 7, 7 positioned on both sides, by first oil outlet holes 11, 11 . . . extending radially through the casing 1. The other 4 grooves 5, 5 . . . are in communication with the other annular grooves 7, 7 by second oil outlet holes 12, 12 formed similarly. Moreover, the four (4) grooves 6, 6 . . . which are positioned alternately among the grooves 6, 6 . . . of the valve body 2 are in communication with the center annular groove 7, by oil inlet holes 10, 10 . . . extending radially through the casing 1 and opened outside thereof. The other 4 grooves 6, 6 . . . are in communication with a center core 20 of the valve body 2 by return oil holes 13 extending radially through the valve body 2. The center core 20 serves as a return oil path and is connected to the oil tank T maintained at low pressure.

That is, the grooves 5, 5 . . . of the casing 1 are in communication alternately with the oil chamber $S_1$ or $S_2$, to which pressure oil produced by the hydraulic pump P is sent via the oil outlet hole 11 and annular groove 7 or the oil outlet hole 12 and annular groove 7 respectively. Also the grooves 6, 6 of the valve body 2 are in communication alternately with the hydraulic pump P of the high pressure source or the oil tank T of the lower pressure source via the oil inlet hole 10 and annular groove 7, or the return oil hole 13 and center core 20. Accordingly, the pressure oil produced by the oil pump P is introduced into the groove 6 of the valve body 2 via the center annular groove 7 and oil inlet hole 10, passing through the communicating portions 8, 8 on lateral sides of the groove 6 into the adjoining grooves 5, 5 of the casing 1. Subsequently, the pressure oil passes through the communicating portion 8, 8 on the opposite side of the groove 6 in the grooves 5, 5 into the grooves 6, 6 communicating with the oil tank T, then flows back to the oil tank T via the return oil hole 13 and center core 20. When the areas of communicating portions 8, 8 on both sides of the groove 6 are same, or when the steering torque is not applied to the steering wheel and the relative angular displacement is not produced between the casing 1 and valve body 2, the pressure difference is not produced between the adjoining grooves 5, 5 on both sides of the groove 6. Thus, pressure in the oil chambers $S_1$, $S_2$ of the hydraulic cylinder S communicating therewith respectively through the oil outlet holes 11, 12 is equal, and the hydraulic cylinder S does not produce the steering assisting power. While, when the steering torque is applied to the steering wheel and the relative angular displacement is produced between the casing 1 and valve body 2, one of the areas of communicating portions 8, 8 increases and the other one decreases. Consequently, the pressure in the groove 5 communicating with the groove 6 via the former becomes higher than that in the groove 5 communicating with the groove 6 via the latter. Thus, the pressure difference produced between the two grooves 5, 5, or the pressure difference corresponding to the direction and magnitude of the steering torque is produced between the oil chambers $S_1$, $S_2$ communicating respectively therewith, and the hydraulic cylinder S produces the steering assisting power corresponding to the pressure difference.

In a power steering apparatus, the desirable increment characteristics of the steering assisting power produced by the hydraulic cylinder S against the increment of steering torque is such that, as previously described, when the steering torque is small, the steering assisting power is maintained approximately at zero (0), and thereafter the steering assisting power which increases gradually in proportion to the increment of steering torque is obtained, furthermore, after exceeding the other predetermined value larger than the aforesaid predetermined value, the steering assisting power which increases rapidly against the increment of steering torque can be obtained. Such characteristics is realized by the communicating areas of the communicating portions 8, 8, which change gently responsive to the increment of relative angular displacement between the casing 1 and valve body 2 while it is smaller, and change suddenly after it exceeds the predetermined value.

In the hydraulic pressure control valve according to the second invention, notches 9 are formed at the corners between the inner circumferential surface of the casing 1 and the side walls of the grooves 5, or at the corners between the peripheral surface of the valve body 2 and the side walls of the groove 6, to realize such area variations in the communicating portions 8, 8 and to reduce flowing noises due to the pressure oil flow.

Figure 10:
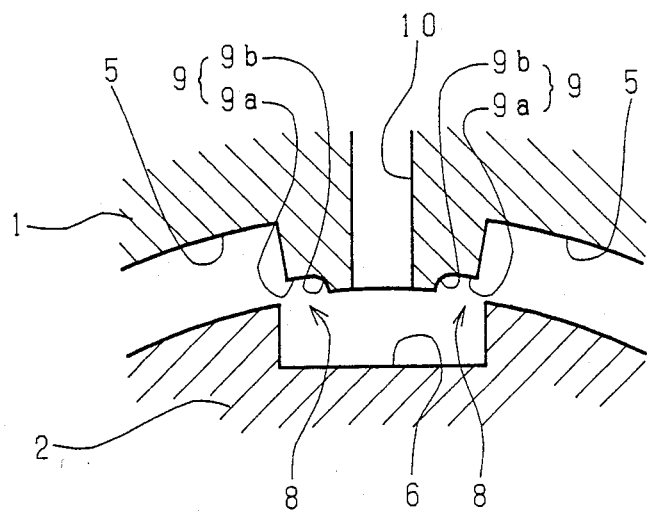
FIG. 10 is a partially enlarged view of FIG. 9 showing the forming mode of notches.
Figure 11:
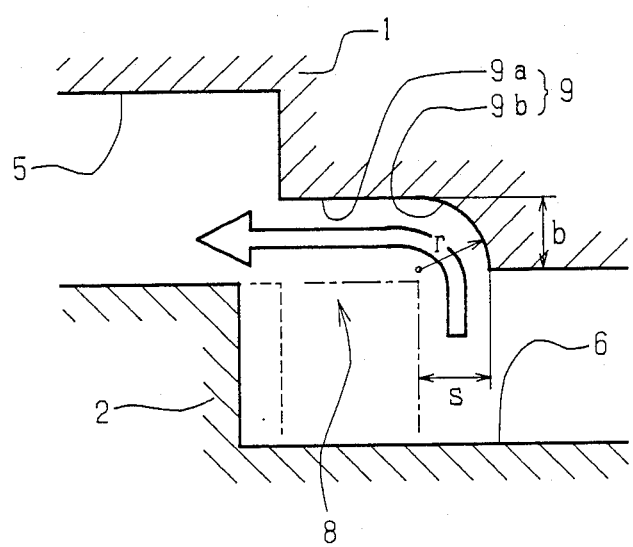
FIG. 11 is an explanatory view showing the flowing state in a notch.
Figure 12:
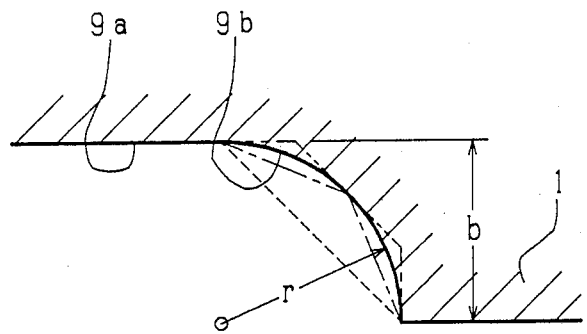
FIGS. 12 and 13 are explanatory views showing the detailed shape of a notch.
Figure 13:
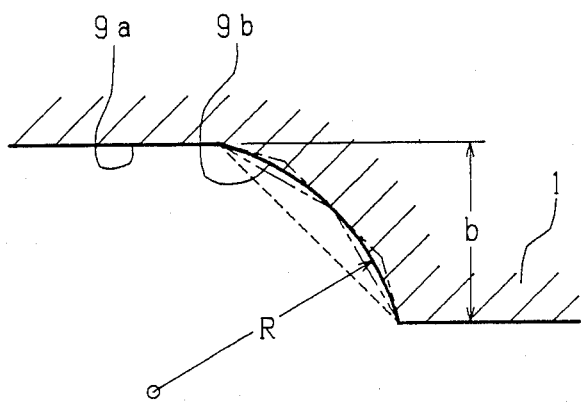

FIG. 10 is a partially enlarged view of FIG. 9 showing the forming mode of notches 9, 9, FIG. 11 is an explanatory view of the flowing mode of pressured oil at the notch 9 and FIGS. 12 and 13 are views showing detailed shapes of the notch 9.

As shown in FIG. 10, though notches 9, 9 are formed at the corners between the inner circumferential surface of the casing 1 and the side walls of the grooves 5, they may be formed at the corners between the peripheral surface of the valve body 2 and the side walls of the groove 6. As to be described later, the notch 9 has a sectional shape consisting of the straight line and circular arc, practically, it is desirable to form the notches 9, 9 on the casing 1 since it is difficult to form it on the valve body 2 from the machining point of view. When forming the notches 9 on the casing 1, they can be formed simultaneously and simply when finishing the inner circumferential surface of the casing 1 and forming the grooves 5, 5, by using a broach including projections to be described later corresponding to the sectional shape of the notch 9, for finishing the inner circumferential surface of the casing 1 and forming the grooves 5, 5.

The notch 9 comprises a first portion 9a which is a straight line or circular arc parallel to the inner circumferential surface of the casing 1, extending to the mid portion of the side wall of the groove 5 and having the depth b radially, and a second portion 9b which links the portion 9a and the inner circumferential surface of the casing 1. The most desirable shape as the second portion 9b is, as shown by the solid line in FIG. 12, consisting of a quarter arc having a radius r equal to the depth b, contacting to the first portion 9a and intersecting with the inner circumferential surface of the casing 1 approximately at right angles. Shapes of the second portion 9b are not limited thereto, they may be composed of a single or plural straight lines closely resembling to the circular arc such as a chord linking end points of the circular arc as indicated by the broken line in FIG. 12, or two chords linking end points and the center of the circular arc as indicated by the one-dot chain line, or furthermore, 3 tangential lines at end points and the center of the circular arc as indicated by the two-dot chain line.

Moreover, as indicated by the solid line in FIG. 13, they may be composed of a circular arc having a radius R larger than the depth b, approximately contacting the first portion 9a and intersecting with the inner circumferential surface of the casing 1 at an angle close to right angles, or a single straight line or composition of plural straight lines resembling closely to the circular arc as indicated by the broken line, one-dot chain line or two-dot chain line in the figure.

The flowing mode of pressured oil in the communicating portion 8 is as indicated by the white arrow in FIG. 11. For example, the pressured oil which flows through the communicating portion 8 to the groove 5 from the groove 6, first flows into the notch 9 passing through a gap between the corner, between the side wall of the groove 6 and the peripheral surface of the valve body 2, and the second portion 9b. Then, it changes the flowing direction and flows into the groove 5 passing circumferentially to the casing 1 through the flow path formed between the first portion 9a and the peripheral surface of the valve body 2. When the gap width is narrower, the pressured oil flows into the notch 9 approximately radially to the casing 1 and changes its flow almost perpendicularly in the notch 9. Though the pressured oil which flows into the notch 9 strikes the second portion 9b linked to the inner circumferential surface of the casing 1 and changes its flow along the portion 9b, since the second portion 9b is shaped as aforementioned and linked smoothly to the first portion 9a, the direction of flow is changed gradually as shown in FIG. 11 without producing a substantial turbulent flow, thus the flowing noise of pressured oil is reduced sharply as compared with the prior art hydraulic pressure control valve.

Figure 14:
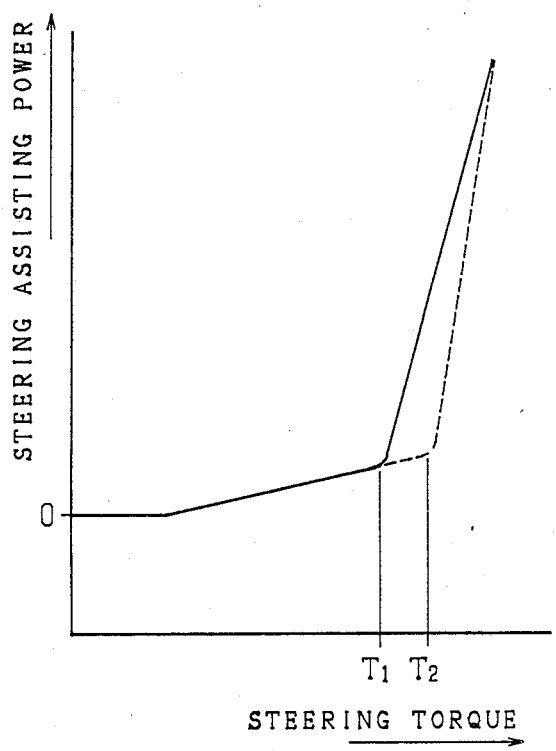
FIG. 14 is a graph showing variations of a steering assisting power relative to the steering torque applied to a steering wheel in a power steering apparatus including a hydraulic pressure control valve according to the second invention.

Furthermore, the variation mode of communicating areas in the communicating portion 8 having the notch 9 shaped as aforementioned will be described in connection with FIG. 11. When the torsion bar 4 is distorted and the relative angular displacement is produced between the casing 1 and valve body 2 by the steering torque applied to the steering wheel, the corner between the peripheral surface of the valve body 2 and the side wall of the groove 6 is moved relatively circumferentially to the casing 1. By the relative movement, the corner reaches the position indicated by the broken line in the figure, and corresponds to the side wall of the groove 5 circumferentially. Thereafter, the corner arrives at the position indicated by the one-dot chain line in the figure, and the circumferential gap width s between the intersection, between the second portion 9b of the notch 9 and the inner circumferential surface of the casing 1, and the corner becomes approximately equal to the depth b of the first portion 9a. Up till then, the areas of communicating portion 8 depend upon the depth b, and since the first portion 9a is in parallel to the peripheral surface of the casing 1, the communicating areas do not substantially change against the increment of relative movement, or of the relative angular displacement between the casing 1 and the valve body 2. When the larger relative angular displacement has occurred, the communicating areas thereafter depend upon the minimum distance between the corner and respective parts of the second portion 9b. When the second portion 9b is a quarter arc as shown in FIG. 11, the minimum distance never becomes less than the circumferential gap width s, thus in the same way as the conventional hydraulic pressure control valve, the variation mode which increases suddenly against the increment of relative angular displacement can be obtained. When the second portion 9b is formed by a single straight line as indicated by the broken line in FIGS. 12 and 13, the minimum distance between the corner and the second portion 9b becomes less than the circumferential width s, thus when this is applied in a power steering apparatus, increment characteristics of the steering assisting power as indicated by the solid line in FIG. 14 can be obtained. A curve indicated by the broken line in the figure is the characteristics obtained in the power steering apparatus using the conventional hydraulic pressure control valve having the notch 50 shown in FIG. 2. As it will be apparent from the figure, the difference of variation mode of the communicating areas as aforementioned is represented as the difference of steering torque at a build-up point of the sudden-increase portion of steering assisting power, and the steering torque $T_1$ becomes more or less smaller when compared to the conventional similar steering torque $T_2$, thus the inclination at the sudden-increase portion becomes slightly smaller as compared with the conventional one, but the difference is substantially insignificant. Furthermore, when the second portion 9b is formed as indicated by the solid line, one-point dot line or two-point dot line in FIGS. 12 and 13, increment characteristics of the steering assisting power approaches the characteristics indicated by the broken line in FIG. 14, and the characteristics as close as possible to the desired characteristics in the steering assisting power can be obtained.

Figure 15:
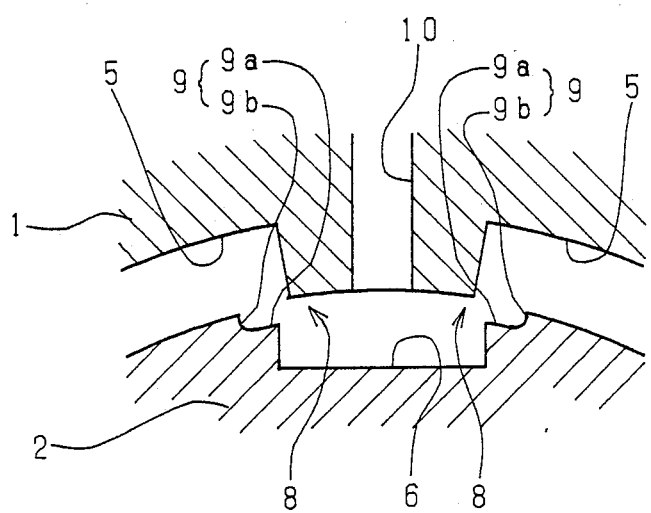
FIG. 15 is an enlarged sectional view showing the forming mode of notches of another embodiment of the second invention.

FIG. 15 is an enlarged sectional view showing the forming mode of notches of another embodiment of the second invention, in which the notches 9 are formed not on the casing but at corners of the valve body 2 in the same shape as the aforesaid embodiment. Also in such notches 9, as the flowing direction of pressured oil is changed gradually in the same way as the aforesaid embodiment, it is similarly efficacious.

As particularly described hereinabove, in a hydraulic pressure control valve according to the second invention, since the flowing direction of the pressured oil in communicating portions is changed smoothly along the second portion, and not only the flowing noise of pressured oil in the communicating portions is restrained but the area variation characteristics therein can also be made desirably, when the hydraulic pressure control valve is applied in a power steering apparatus, the desired increment characteristics of the steering assisting power can be realized against the increment of steering torque.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A hydraulic pressure control valve comprising:
   a cylindrical casing having a plurality of first grooves formed on its inner circumferential surface at specified intervals and being in communication with a plurality of pressurized oil destinations, and a land formed between each of said grooves, alternate lands being in communication with a high pressure source; and
   a valve body rotatably disposed in said casing and having additional grooves of the same number as said first grooves and formed on the peripheral surface of the valve body at specified intervals, the additional grooves comprising second, third and fourth grooves;
   said second grooves being disposed in a circumferential direction opposite to said alternate lands in communication with a high pressure source;
   said third grooves being in communication with a low pressure source and disposed between alternate said second grooves;
   said fourth grooves being disposed in the remaining grooves, between alternate said second grooves, said fourth grooves being disconnected from the low pressure source, and forming communicating portions between adjacent first grooves of said casing via said fourth grooves; and
   notches disposed at corners of one of said valve body and said casing, said notches opposing each other across the communicating portions on both sides of said fourth grooves, said notches configured such that, until relative angular displacement between the valve body and casing reaches a predetermined magnitude, variations of the communicating portions is substantially not produced by said relative angular displacement.

2. A hydraulic pressure control valve as defined by claim 1 wherein said notches each include a first portion substantially parallel to one of the inner circumferential surface of said casing and the peripheral surface of said valve body, and a second portion having an axial sectional shape forming a circular arc and having a radius approximately equal to the radial depth from said one of said inner circumferential surface and the peripheral surface in said first portion, wherein said second portion links said first portion and said one of said inner circumferential surface or peripheral surface.

3. A hydraulic pressure control valve as defined by claim 1 wherein said notches each include a first portion substantially parallel to one of the inner circumferential surface of said casing and the peripheral surface of said valve body, and a second portion having an axial sectional shape composed of at least one straight line closely approximating a circular arc and having a radius approximately equal to the radial depth from said one of said inner circumferential surface and the peripheral surface in said first portion, wherein said second portion links said first portion and said one of said inner circumferential surface or peripheral surface.

4. A hydraulic pressure control valve comprising:
   a cylindrical casing having a plurality of first lands formed on its inner circumferential surface at specified intervals and being in communication with a plurality of pressurized oil destinations, and a groove formed between each of said lands, alternate grooves being in communication with a high pressure source; and
   a valve body rotatably disposed in said casing and having additional lands of the same number as said first lands and formed on the peripheral surface of the valve body at specified intervals, the additional lands comprising second, third and fourth lands;
   said second lands being disposed in a circumferential direction opposite to said alternate grooves in communication with a high pressure source;
   said third lands being in communication with a low pressure source and disposed between alternate said second lands;
   said fourth lands being disposed in the remaining lands, between alternate said second lands, said fourth lands being disconnected from the low pressure source, and forming communicating portions between adjacent first lands of said casing via said fourth lands; and
   notches disposed at corners of one of said valve body and said casing, said notches opposing each other across the communicating portions on both sides of said fourth lands, said notches configured such that, until relative angular displacement between the valve body and casing reaches a predetermined magnitude, variations of the communicating portions is substantially not produced by said relative angular displacement.

5. A hydraulic pressure control valve as defined by claim 4 wherein said notches each include a first portion substantially parallel to one of the inner circumferential surface of said casing and the peripheral surface of said valve body, and a second portion having an axial sectional shape forming a circular arc and having a radius approximately equal to the radial depth from said one of said inner circumferential surface and the peripheral surface in said first portion, wherein said second portion links said first portion and said one of said inner circumferential surface or peripheral surface.

6. A hydraulic pressure control valve as defined by claim 4 wherein said notches each include a first portion substantially parallel to one of the inner circumferential surface of said casing and the peripheral surface of said valve body, and a second portion having an axial sectional shape composed of at least one straight line closely approximating a circular arc and having a radius approximately equal to the radial depth from said one of said inner circumferential surface and the peripheral surface in said first portion, wherein said second portion links said first portion and said one of said inner circumferential surface or peripheral surface.

7. A hydraulic pressure control valve comprising:
   a cylindrical casing having a plurality of first grooves formed on its inner circumferential surface at specified intervals and being in communication with a plurality of pressurized oil destinations, and a land formed between each of said grooves, alternate lands being in communication with a high pressure source; and
   a valve body rotatably disposed in said casing and having additional grooves of the same number as said first grooves and formed on the peripheral surface of the valve body at specified intervals, the additional grooves comprising second, third and fourth grooves;

said second grooves being disposed in a circumferential direction opposite to said alternate lands in communication with a high pressure source;

said third grooves being in communication with a low pressure source and disposed between alternate said second grooves;

said fourth grooves being disposed in the remaining grooves, between alternate said second grooves, said fourth grooves being disconnected from the low pressure source, and forming communicating portions between adjacent first grooves of said casing via said fourth grooves; and notches disposed at corners of one of said valve body and said casing, each notch including a first portion substantially parallel to one of the inner circumferential surface of said casing and the peripheral surface of said valve body, and a second portion having an axial sectional shape forming a circular arc and having a radius approximately equal to the radial depth from said one of said inner circumferential surface and the peripheral surface in said first portion, wherein said second portion links said first portion and said one of said inner circumferential surface or peripheral surface.

8. A hydraulic pressure control valve comprising:

a cylindrical casing having a plurality of first lands formed on its inner circumferential surface at specified intervals and being in communication with a plurality of pressurized oil destinations, and a groove formed between each of said lands, alternate grooves being in communication with a high pressure source; and a valve body rotatably disposed in said casing and having additional lands of the same number as said first lands and formed on the peripheral surface of the valve body at specified intervals, the additional lands comprising second, third and fourth lands;

said second lands being disposed in a circumferential direction opposite to said alternate grooves in communication with a high pressure source;

said third lands being in communication with a low pressure source and disposed between alternate said second lands;

said fourth lands being disposed in the remaining lands, between alternate said second lands, said fourth lands being disconnected from the low pressure source, and forming communicating portions between adjacent first lands of said casing via said fourth lands; and notches disposed at corners of one of said valve body and said casing, each notch including a first portion substantially parallel to one of the inner circumferential surface of said casing and the peripheral surface of said valve body, and a second portion having an axial sectional shape forming a circular arc and having a radius approximately equal to the radial depth from said one of said inner circumferential surface and the peripheral surface in said first portion, wherein said second portion links said first portion and said one of said inner circumferential surface or peripheral surface.

9. A hydraulic pressure control valve comprising:

a cylindrical casing having a plurality of first grooves formed on its inner circumferential surface at specified intervals and being in communication with a plurality of pressurized oil destinations, and a land formed between each of said grooves, alternate lands being in communication with a high pressure source; and a valve body rotatably disposed in said casing and having additional grooves of the same number as said first grooves and formed on the peripheral surface of the valve body at specified intervals, the additional grooves comprising second, third and fourth grooves;

said second grooves being disposed in a circumferential direction opposite to said alternate lands in communication with a high pressure source;

said third grooves being in communication with a low pressure source and disposed between alternate said second grooves;

said fourth grooves being disposed in the remaining grooves, between alternate said second grooves, said fourth grooves being disconnected from the low pressure source, and forming communicating portions between adjacent first grooves of said casing via said fourth grooves; and notches disposed at corners of one of said valve body and said casing, each notch including a first portion substantially parallel to one of the inner circumferential surface of said casing and the peripheral surface of said valve body, and a second portion having an axial sectional shape composed of at least one straight line closely approximating a circular arc and having a radius approximately equal to the radial depth from said one of said inner circumferential surface and the peripheral surface in said first portion, wherein said second portion links said first portion and said one of said inner circumferential surface or peripheral surface.

10. A hydraulic pressure control valve comprising:

a cylindrical casing having a plurality of first lands formed on its inner circumferential surface at specified intervals and being in communication with a plurality of pressurized oil destinations, and a groove formed between each of said lands, alternate grooves being in communication with a high pressure source; and a valve body rotatably disposed in said casing and having additional lands of the same number as said first lands and formed on the peripheral surface of the valve body at specified intervals, the additional lands comprising second, third and fourth lands;

said second lands being disposed in a circumferential direction opposite to said alternate grooves in communication with a high pressure source;

said third lands being in communication with a low pressure source and disposed between alternate said second lands;

said fourth lands being disposed in the remaining lands, between alternate said second lands, said fourth lands being disconnected from the low pressure source, and forming communicating portions between adjacent first lands of said casing via said fourth lands; and notches disposed at corners of one of said valve body and said casing, each notch including a first portion substantially parallel to one of the inner circumferential surface of said casing and the peripheral surface of said valve body, and a second portion having an axial sectional shape composed of at least one straight line closely approximating a circular arc and having a radius approximately equal to the radial depth from said one of said inner circumferential surface and the peripheral surface in said first portion, wherein said second portion links said first portion and said one of said inner circumferential surface or peripheral surface.

* * * * *